(12) United States Patent
Hsiao et al.

(10) Patent No.: US 8,807,890 B2
(45) Date of Patent: Aug. 19, 2014

(54) FACE HOB HYPOID GEAR TOOTH TOP-LAND RADIUS BY COMMON CHAMFER TOOL

(71) Applicants: Chunliang Hsiao, Troy, MI (US); Stefano Lombardo, Shelby Township, MI (US); Paul J. Bojanowski, Macomb, MI (US)

(72) Inventors: Chunliang Hsiao, Troy, MI (US); Stefano Lombardo, Shelby Township, MI (US); Paul J. Bojanowski, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 13/630,089

(22) Filed: Sep. 28, 2012

(65) Prior Publication Data

US 2013/0022424 A1 Jan. 24, 2013

Related U.S. Application Data

(62) Division of application No. 12/617,785, filed on Nov. 13, 2009, now abandoned.

(51) Int. Cl.
*B23F 21/12* (2006.01)
*B23F 21/22* (2006.01)

(52) U.S. Cl.
CPC .................................. *B23F 21/226* (2013.01)
USPC ...................... 409/8; 409/39; 407/21; 407/29

(58) Field of Classification Search
USPC ................... 409/8, 25, 38, 39, 50, 56, 57, 10; 407/20, 21, 29
IPC ........................... B23F 1/06,9/08, 21/22, 21/12
See application file for complete search history.

(56) References Cited

U.S. PATENT DOCUMENTS

| | | | | |
|---|---|---|---|---|
| 2,438,329 A * | 3/1948 | Wildhaber | | 409/8 |
| 3,797,361 A * | 3/1974 | Redin | | 409/8 |
| 7,431,544 B2 * | 10/2008 | Ribbeck | | 409/8 |
| 2005/0207858 A1 * | 9/2005 | Muller et al. | | 409/8 |
| 2009/0097934 A1 * | 4/2009 | Hsiao et al. | | 409/26 |

FOREIGN PATENT DOCUMENTS

| | | |
|---|---|---|
| GB | 393173 A | 6/1933 |
| JP | 1246014 A | 10/1989 |

OTHER PUBLICATIONS

Handbook on Face Gear Drives with a Spur Involute Pinion; E. Litvin et al.; NASA/CR-2000-209909; Mar. 2000; 104 pages.

* cited by examiner

*Primary Examiner* — Daniel Howell
*Assistant Examiner* — Michael Vitale
(74) *Attorney, Agent, or Firm* — Bejin VanOphem & Bieneman PLC

(57) ABSTRACT

A ring gear or pinion common outside chamfer tool and a common inside chamfer tool are disclosed. The common chamfer tools comprise a shank, a tip end and a chamfering edge. The shank is attachable to a gear cutter and has a tip end formed on the distal end thereof. The chamfering edge is positioned within the tip end and is configured to form a tooth top-land radius of multiple gear ratios. A method of designing a ring gear or pinion common outside chamfer tool and common inside chamfer tool for multiple gear ratios is also described.

4 Claims, 6 Drawing Sheets

FACE HOB HYPOID GEAR TOOTH TOP-LAND RADIUS BY COMMON CHAMFER TOOL

CROSS REFERENCE TO RELATED APPLICATIONS

This application is a divisional of U.S. patent application Ser. No. 12/617,785, filed on Nov. 13, 2009, which is hereby incorporated by reference in its entirety.

TECHNICAL FIELD

The present disclosure generally relates to gear cutting and forming, and in particular, to a common outside chamfer tool and a common inside chamfer tool for forming the gear top-land radius of different ratios.

BACKGROUND

Hypoid gears are generally formed with a cutting machine that rotates both a cutter tool and a stock piece of metal while the axis of rotation of the cutter tool and the stock are orientated at an angle. The cutter tool and/or the stock are advanced toward one another, generally along the axis of rotation as the blades of the cutter tool shave material from the stock to form gear teeth on the stock. Some machines will vary the orientation of the cutter tool and/or stock perpendicular to the axis of rotation during cutting to form a desired hypoid tooth shape. Both pinion and ring gears of a hypoid gear set may be cut in this manner.

A gear cutting tool generally includes a plurality of inside cutter blades and a plurality of outside cutter blades extending therefrom to form the teeth of a hypoid gear. Typically, the pinion or ring gear outside cutter blades form the pinion drive side or the ring gear coast side of a hypoid tooth profile and the pinion or ring gear inside cutter blades form the pinion coast side or the ring gear drive side of a hypoid tooth profile. Many cutting tools are dimensioned such that different cutter blades are needed to form the gear teeth of different gear ratios.

A chamfer is commonly applied to the tip of the gear teeth to reduce the acute angular corners that form when the cutter blades remove material from the stock. If not reduced, the corners can be chipped or nicked and cause detrimental noise. Various methods of producing a chamfer exist including, manual filing and the use of gear cutting machines with chamfering attachments. The cutter blades may also be configured with chamfering edges that enable the cutter blades to cut a side of the gear tooth and form a chamfer on the tooth simultaneously. However, this requires a unique top-land radius chamfer tool for each ratio.

BRIEF SUMMARY

A ring gear or pinion common outside chamfer tool and a common inside chamfer tool are disclosed. The common chamfer tools comprise a shank, a tip end and a chamfering edge. The shank is attachable to a gear cutter and has a tip end formed on the distal end thereof. The chamfering edge is positioned within the tip end and is configured to form a gear tooth top-land radius of multiple gear ratios. A method of designing a ring gear or pinion common outside chamfer tool and common inside chamfer tool for multiple gear ratios is also described.

BRIEF DESCRIPTION OF THE DRAWINGS

The features and inventive aspects of the present disclosure will become more apparent upon reading the following detailed description, claims, and drawings, of which the following is a brief description:

DETAILED DESCRIPTION

Figure 1:
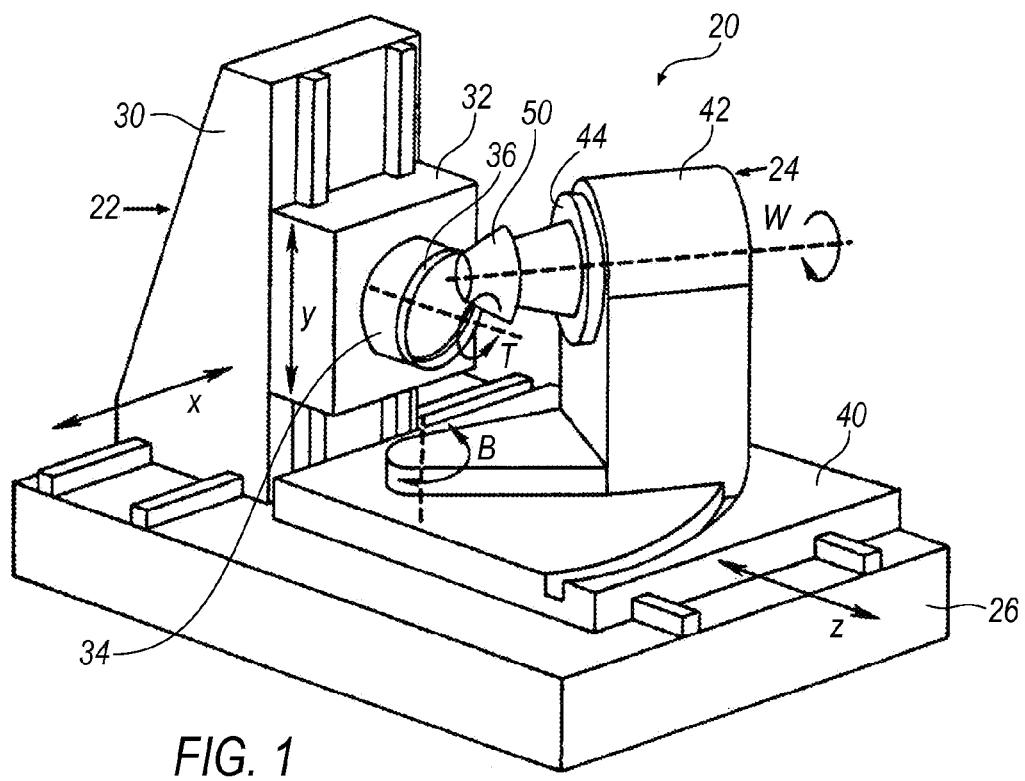
FIG. 1 is a schematic perspective view of a gear cutter system.

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

FIG. 1 illustrates an embodiment of a gear cutting system 20. The system 20 includes a tool support 22, and a work support 24 supported by a base 26. The tool support 22 includes a carriage 30, a tool head 32, a tool spindle 34, and a cutting tool, illustrated generally at 36. The carriage 30 is moveable relative to the base 26 generally in the spatial direction X. The tool head 32 is moveable relative to the carriage 30 generally in the spatial direction Y. The tool spindle 34 may be moveable relative to the tool head 32 generally in the spatial direction Z while rotating the tool head 36. Accordingly, the tool head 36 may be rotated in the rotational direction T and moved in any of the spatial directions X, Y, Z simultaneously. Further, these movements are controlled by a device such as a computer numeric control (CNC) machine that may be capable of very fine adjustments on the order of millionths of an inch.

The work support 24 includes a table 40, a work head 42, and a work spindle 44. The work spindle 44 is illustrated with a gear stock 50 attached thereto. The work table 40 is moveable relative to the base 26 generally in the spatial direction Z. The work head 42 is moveable relative to the table 40 generally in the rotational direction B. The work spindle 44 is moveable relative to the work head 42 generally in the rotational direction W.

Accordingly, the system 20 may form at least hypoid teeth on the gear stock 50 as the cutting tool 36 is rotated relative to the gear stock 50. Generally, the axis of the gear stock and the cutter tool do not intersect, as illustrated in FIG. 1.

Figure 2:
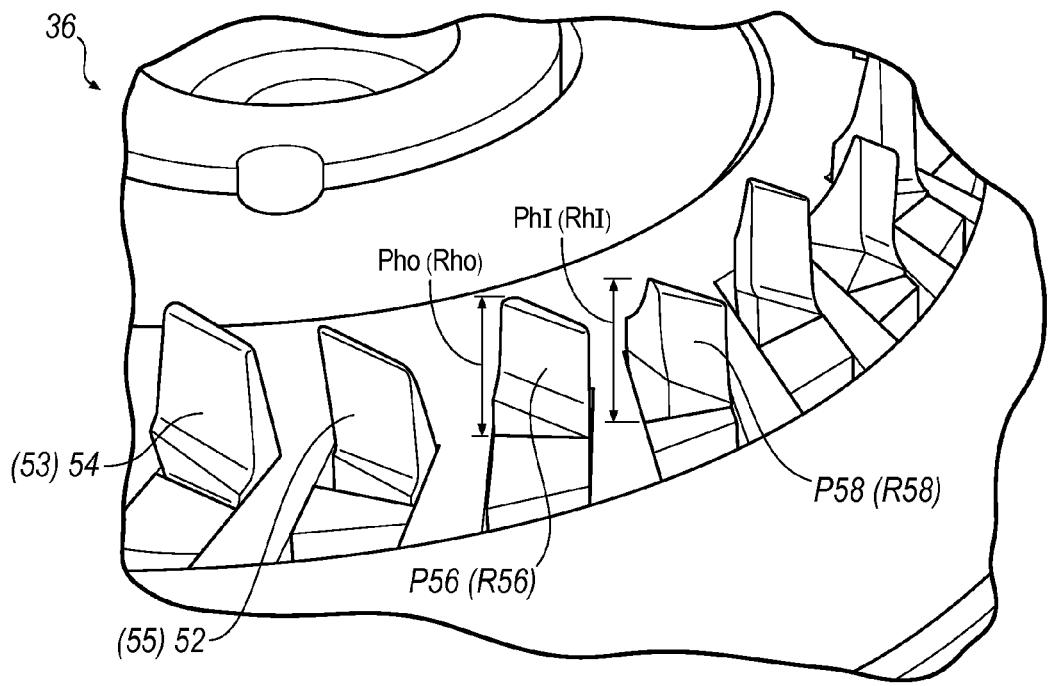
FIG. 2 is a perspective view of and exemplary gear cutting tool.

FIG. 2 illustrates a portion of cutting tool 36. Cutter tool 36 may include pinion or ring gear outside and inside cutter blades designed to form a pinion gear or a ring gear. For example, in FIG. 2, the cutter tool is shown having a plurality of pinion outside cutter blades 54, a plurality of pinion inside cutter blades 52, and at least one common outside chamfer tool P56, and at least one common inside chamfer tool P58. However, in another embodiment, the cutting tool 36 may have a plurality of ring gear outside cutter blades 53, a plurality of ring gear inside cutter blades 55, and at least one common outside chamfer tool R56, and at least one common inside chamfer tool R58.

Figures 3, 4:
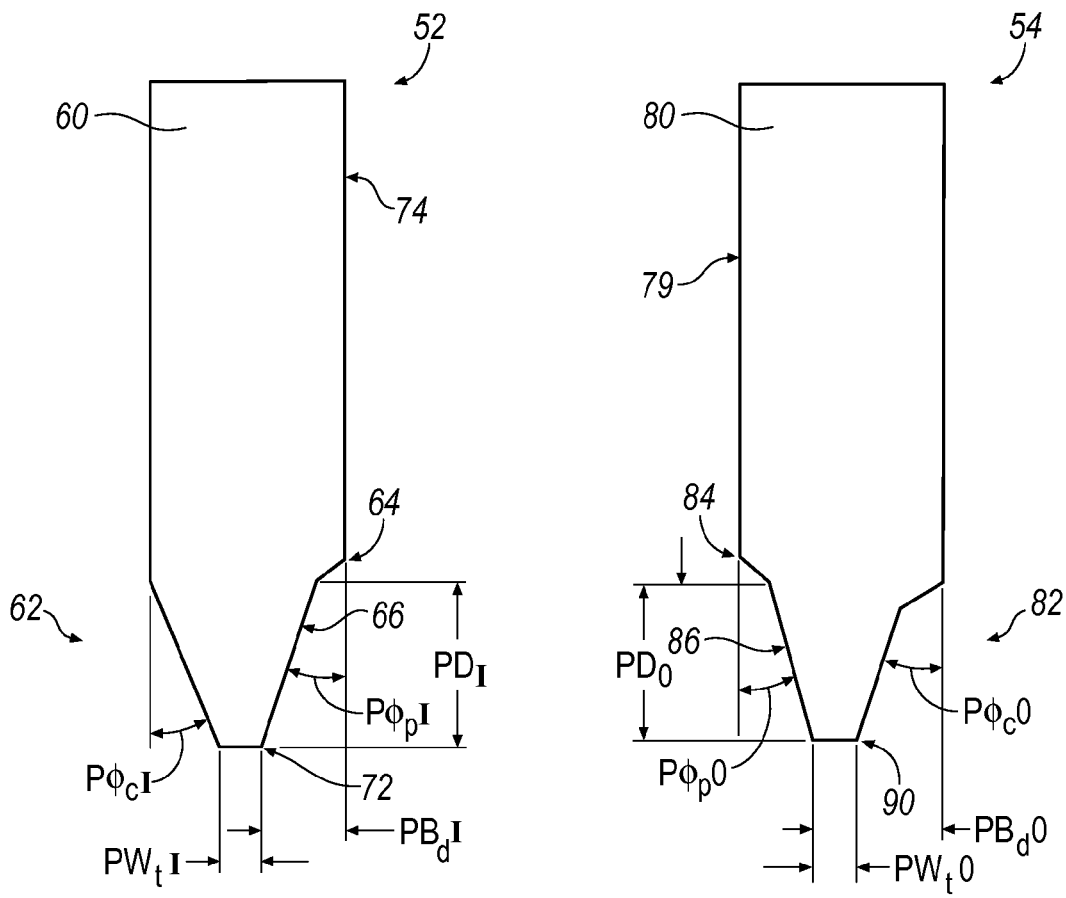
FIG. 3 is a side view of an exemplary pinion inside cutter blade.
FIG. 4 is a side view of an exemplary pinion outside cutter blade.
Figure 5:
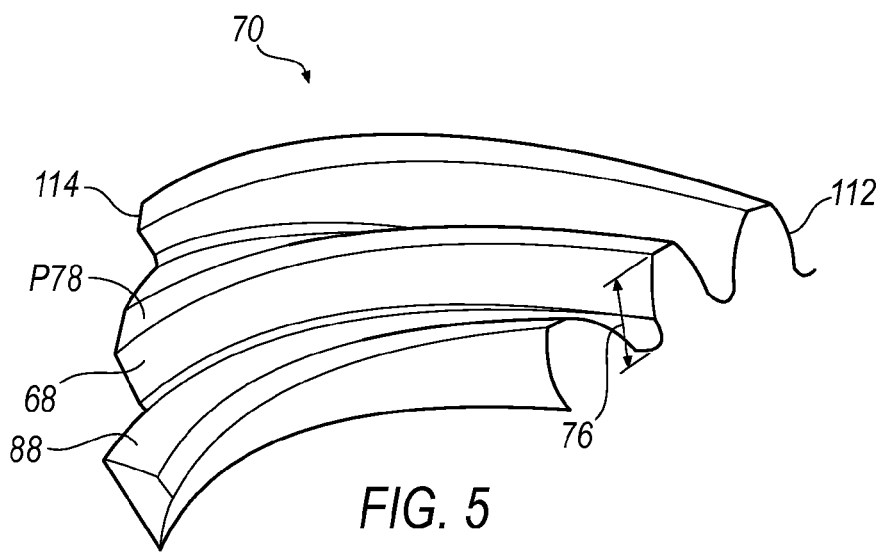
FIG. 5 is a partial sectional schematic view of a pinion gear.

The pinion outside cutter blade 54 generally includes a shank 80 and a tip end 82 formed at a distal end 84 thereof, as seen in FIG. 4. The tip end 82 has a cutting edge 86 adapted to cut a drive side surface 68 of gear tooth 70, as seen in FIG. 5. The cutting edge 86 extends upwardly from a tip 90 at a pressure angle P$\Phi_p$O. The pressure angle P$\Phi_p$O is measured between the cutting edge 86 and a blade seat 79 of the outside cutter blade 54. In one embodiment, a distance PD$_O$ should be greater than the gear whole depth 76 of gear tooth 70, such that the cutter blade generates the tooth profile, but does not directly form a tooth top-land radius P78.

The pinion inside cutter blade 52, generally includes a shank 60 and a tip end 62 formed at a distal end 64 thereof, as seen in FIG. 3. The tip end 62 has a cutting edge 66 adapted to cut a coast side surface 88 of a gear tooth 70, as seen in FIG. 5. The cutting edge 66 extends upwardly from a tip 72 at a pressure angle P$\Phi_p$I. The pressure angle P$\Phi_p$I is measured between the cutting edge 66 and a blade seat 74 of the inside cutter blade 52. In one embodiment, a distance PD$_I$ should be greater than the gear whole depth 76 of gear tooth 70, such that inside cutter blade 52 generates the tooth profile, but does not directly form a tooth top-land radius P78.

Figures 6, 7:
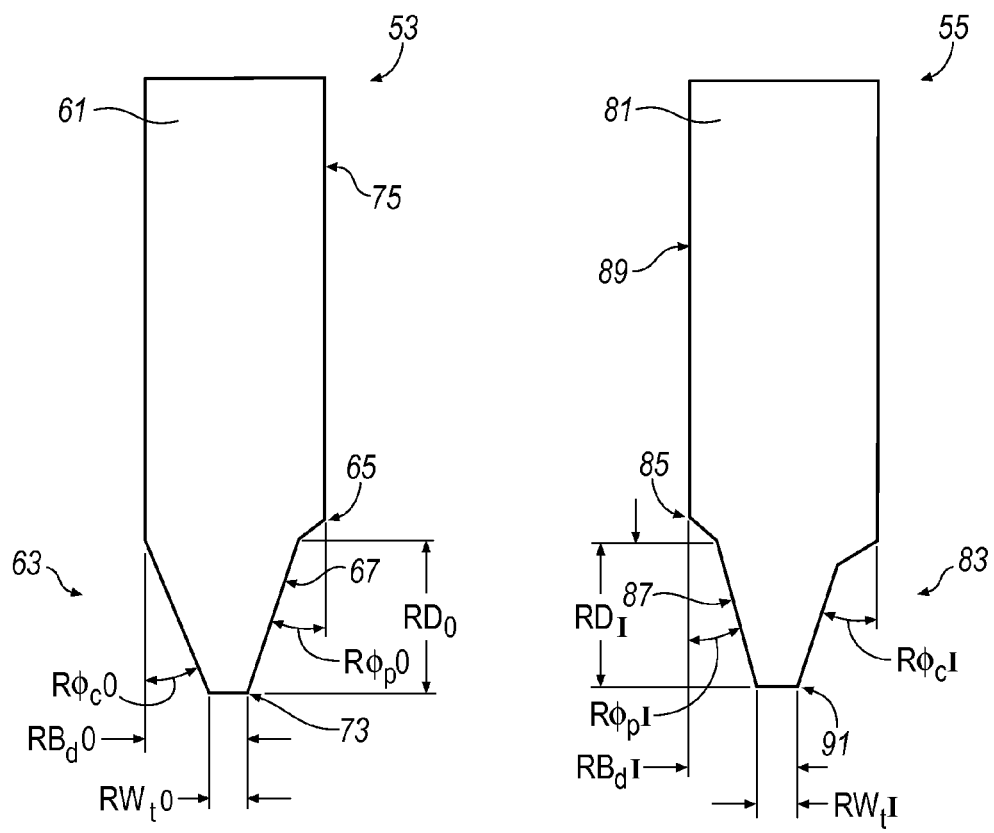
FIG. 6 is a side view of an exemplary ring gear outside cutter blade.
FIG. 7 is a side view of an exemplary ring gear inside cutter blade.
Figure 8:
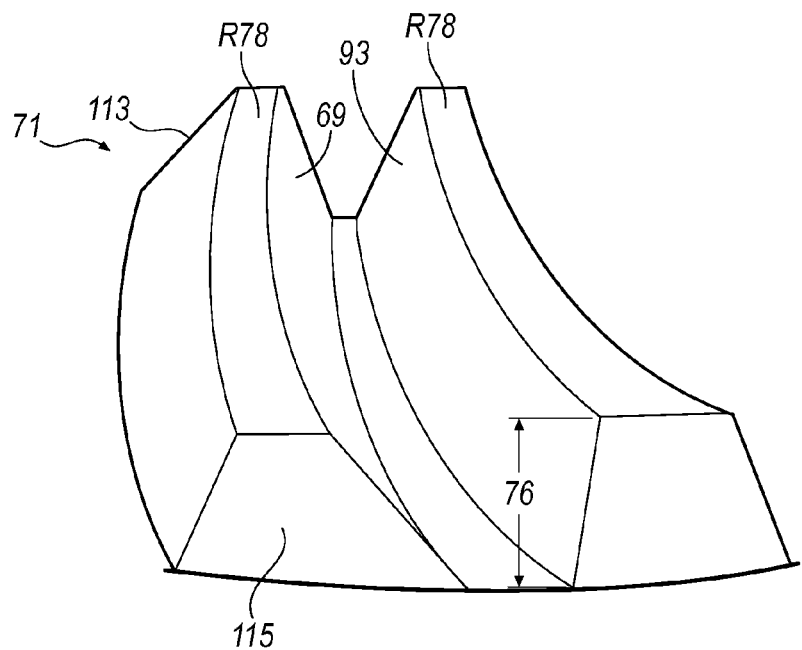
FIG. 8 is a partial sectional schematic view of a ring gear.

Similarly, for cutting a ring gear, the ring gear outside cutter blade 53 generally includes a shank 61 and a tip end 63 formed at a distal end 65 thereof, as seen in FIG. 6. The tip end 63 has a cutting edge 67 adapted to cut a coast side surface 69 of gear tooth 71, as seen in FIG. 8. The inside cutting edge 67 extends upwardly from a tip 73 at a pressure angle R$\Phi_p$O. The pressure angle R$\Phi_p$O is measured between the inside cutting edge 67 and a blade seat 75 of the outside cutter blade 53. In one embodiment, a distance RD$_O$ should be greater than the gear whole depth 76 of gear tooth 71, such that the cutter blade 53 generates the tooth profile, but does not directly form a tooth top-land radius R78.

The ring gear inside cutter blade 55, generally includes a shank 81 and a tip end 83 formed at a distal end 85 thereof, as seen in FIG. 7. The tip end 83 has a cutting edge 87 adapted to cut a drive side surface 93 of a gear tooth 71, as seen in FIG. 8. The cutting edge 87 extends upwardly from a tip 83 at a pressure angle R$\Phi_p$I. The pressure angle R$\Phi_p$I is measured between the cutting edge 87 and a blade seat 89 of the inside cutter blade 55. In one embodiment, a distance RD$_I$ should be greater than the gear whole depth 76 of gear tooth 71, such that inside cutter blade 55 generates the tooth profile, but does not directly form a tooth top-land radius R78.

Generally the outside and inside cutter blades for cutting a pinion gear or a ring gear are ground from uniform blanks allowing for various configurations. However, common outside cutter blades and common inside cutter blades may be used to permit a wide range of cutting depths and radiuses without having to change out the inside and outside cutter blades between operations. Additionally, the cutter blades may be coated with wear resistant materials that resist chipping of the gear cutter blades. This permits the blades to be used for longer periods of time between blade replacements.

In use, the pinion outside cutter blades 54 and the pinion inside cutter blades 52 tend to form gear teeth with acute angular corners. The same is true for the ring gear outside cutter blades 53 and the ring gear inside cutter blades 55. Such corners are prone to nicks or chipping which can cause noise and be generally detrimental to the operation of the gear. Chamfers may be applied to the gear teeth to help alleviate such noise. Typically, the outside and inside chamfer tool designs used for hypoid gears are specific to pinion geometry or ring gear geometry for each gear ratio. That is, a unique outside chamfer tool and a unique inside chamfer tool are needed to generate the tooth top-land radius for each gear ratio. However, common outside chamfer tools and common inside chamfer tools may be designed to create a gear tooth top-land radius of multiple ratios, thus reducing cutter grinder changeover time.

Figure 9A:
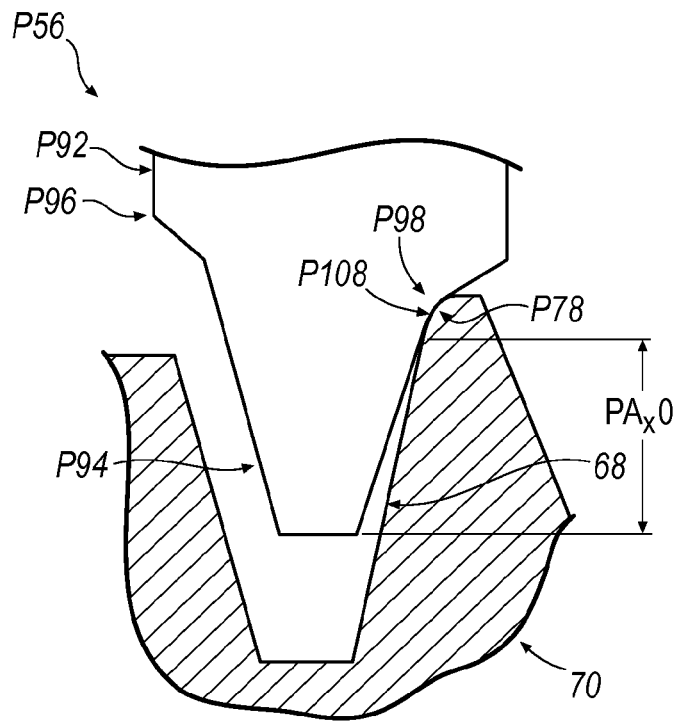
FIGS. 9 (a) and (b) are a side view of an exemplary pinion or ring gear outside chamfer tool and a gear tooth.
Figure 9B:
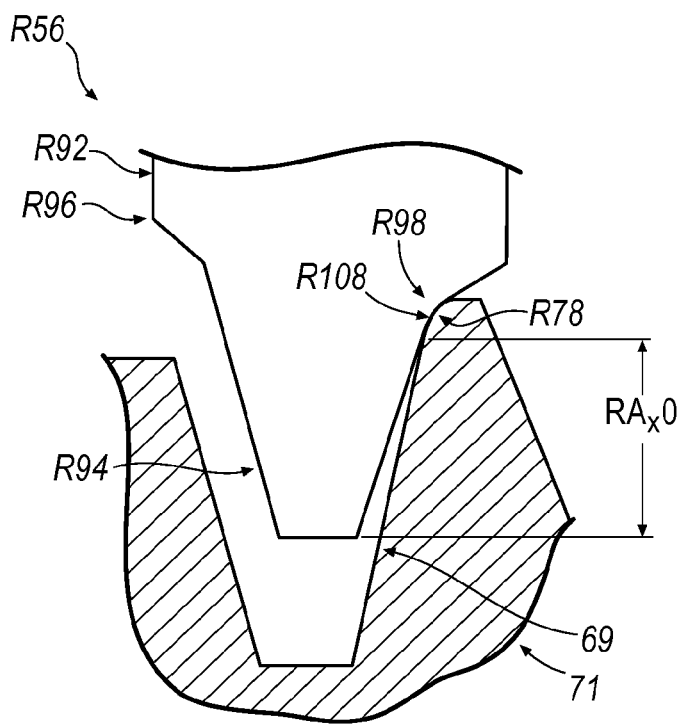
Figure 10A:
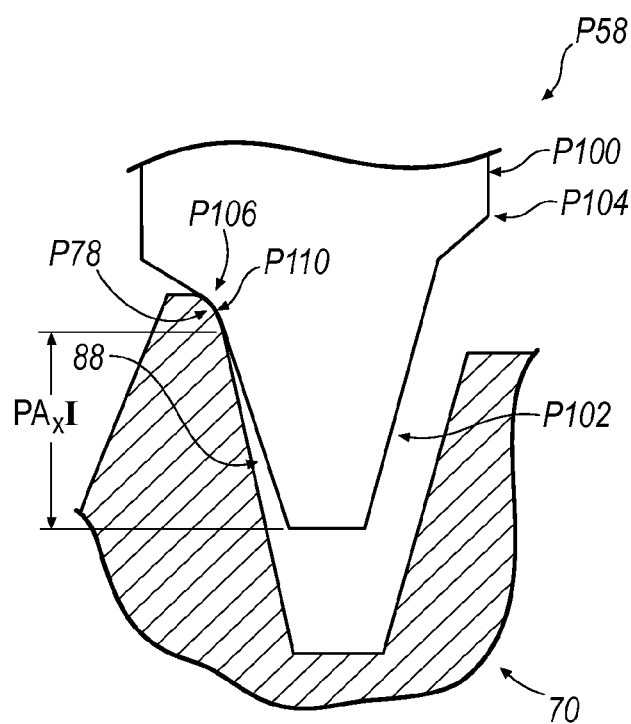
FIGS. 10 (a) and (b) are a side view of an exemplary pinion or ring gear inside chamfer tool and a gear tooth.
Figure 10B:
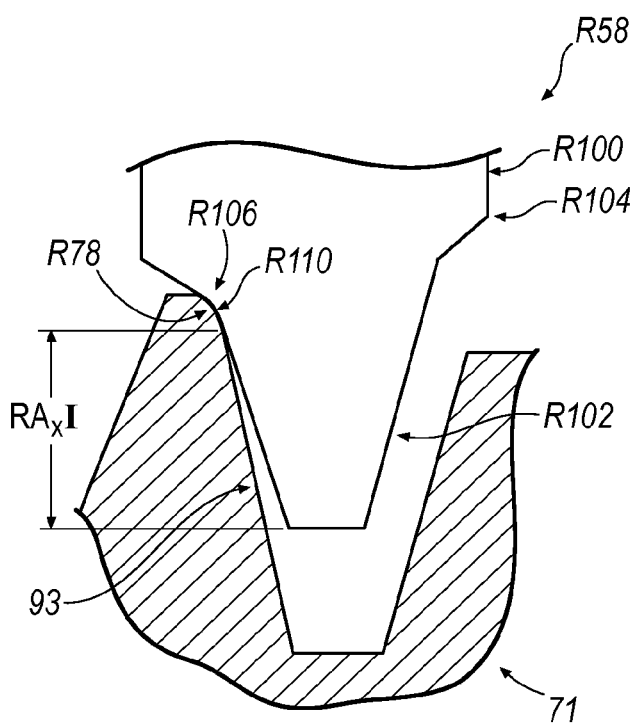

The common outside chamfer tools and the common inside chamfer tools could be designed to form a tooth top-land radius on a pinion gear or a ring gear. The common outside chamfer tool P56 or R56 generally includes a shank P92 or R92 and a tip end P94 or R94 formed at a distal end P96 or R96 thereof, as seen in FIG. 9. The tip end P94 or R94 includes a chamfering edge P98 or R98 adapted to generate a tooth top-land radius P78 or R78 on the drive side surface 68 of a pinion gear or the coast side surface 69 of a ring gear. Similarly, the common inside chamfer tool P58 or R58 generally includes a shank P100 or R100 and a tip end P102 or R102 formed at a distal end P104 or R104 thereof, as seen in FIG. 10. The tip end P102 or R102 includes a chamfering edge P106 or R106 adapted to generate a tooth top-land radius P78 or R78 on the coast side surface 88 of a pinion gear or the drive side surface 93 of a ring gear.

In one embodiment of the common outside chamfer tool P56 or R56, the chamfering edge P98 or R98 may include a shoulder radius cutting edge P108 or R108, as seen in FIG. 9. The shoulder radius cutting edge P108 or R108 may be adapted to form a curved tooth top-land radius P78 on pinion tooth 70 or R78 on ring gear tooth 71. In one embodiment, the shoulder radius cutting edge P108 or R108 forms a tooth top-land radius P78 or R78 along the entire length of the tooth top-land surface. Rounding the tooth top-land P78 or R78 with the shoulder radius cutting edge P108 or R108 reduces harmful chipping which can cause noise. Using a rounded shoulder radius cutting edge P108 or R108 also reduces the stress concentration at the chamfer site. In a similar embodiment of the common inside chamfer tool P58 or R58, the chamfering edge P106 or R106 may include a shoulder radius cutting edge P110 or R110, as seen in FIG. 10. The shoulder radius cutting edge P110 or R110 may be adapted to form a curved tooth top-land on pinion tooth 70 or ring gear tooth 71.

In another embodiment, also seen in FIG. 9, the tip end P94 or R94 of the common outside chamfer tool P56 or R56 generally does not contact gear tooth 70 or 71 other than at the tooth top-land radius P78 or R78. Further the tip end P94 or R94 may have a length PA$_{xo}$ or RA$_{xo}$ that is less than the gear whole depth 76 of gear tooth 70 or 71. This may allow the common outside chamfer tool to cut a portion of the tooth top-land radius without cutting the gear tooth. The length PA$_{xo}$ or RA$_{xo}$ of tip end P94 or R94, being less than the gear whole depth 76, may also allow the common outside chamfer tool to be used in forming the tooth top-land radius of multiple ratios without having to retool. A similar embodiment for the common inside chamfer tool P58 or R58 can be seen in FIG. 10.

The steps involved in designing a common outside chamfer tool and a common inside chamfer tool for a pinion gear or ring gear are illustrated in FIG. 11a-11d.

Figure 11:
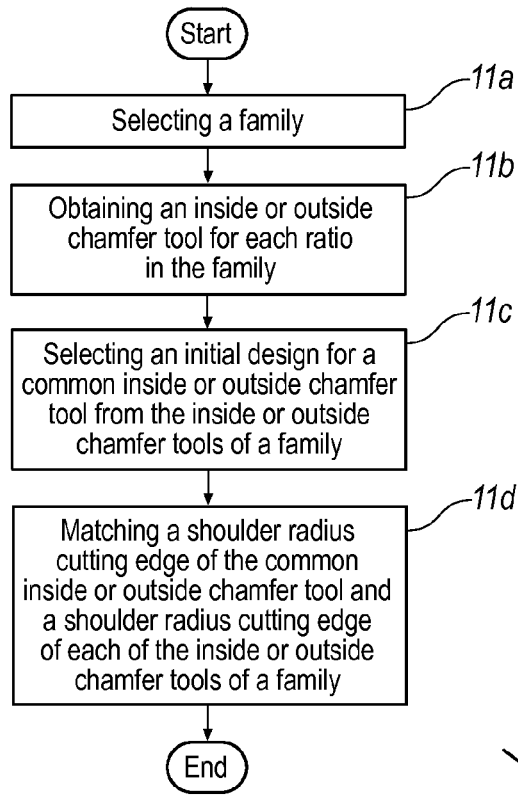
FIG. 11 is a flow diagram of the steps involved in designing the common chamfer tools of FIG. 9 and FIG. 10.

As illustrated in FIG. 11a-11b, the design process begins by selecting a gear family and obtaining or developing the outside chamfer tool design for each ratio found in that family. In order to develop the outside chamfer tool design for each ratio, certain parameters need to be met. For a pinion gear, the cutting edge, clearance angle and edge radius of the outside chamfer tool of each ratio should match the blade cutting edge 86, clearance angle $P\Phi_cO$ and edge radius of the pinion outside cutter blade of the same ratio. The blade distance and the blade top width of the outside chamfer tool of each ratio should also be equal to the blade distance $PB_dO$ and the blade top width $PW_TO$ of the pinion outside cutter blade of the same ratio. For a ring gear, the cutting edge, clearance angle and edge radius of the outside chamfer tool of each ratio should match the blade cutting edge 67, clearance angle $R\Phi_cO$ and edge radius of the ring gear outside cutter blade of the same ratio. The blade distance and the blade top width of the outside chamfer tool of each ratio should also be equal to the blade distance $RB_dO$ and the blade top width $RW_TO$ of the ring gear outside cutter blade of the same ratio. Aligning the parameters of the outside chamfer tools with the parameters of the outside cutter blades creates profiles for the outside chamfer tools that are substantially similar to the profiles of the outside cutter blades for each ratio in the family. This ensures that the outside chamfer tools are designed to form an accurately dimensioned chamfer in a proper location on the gear tooth.

Further, the axial grind depth of the ring gear and pinion outside chamfer tool of each ratio could be 60% of the gear whole depth 76. Therefore, the axial blade height of the outside chamfer tools will affect the toe and heel tooth top-land radius depths of the gear tooth. Additionally, the ring gear and pinion shoulder radius cutting edge of the outside chamfer tool of each ratio could be approximately 60% and 45% of the gear whole depth 76. Increasing or decreasing the shoulder radius cutting edge of the outside chamfer tools will generate a less or more aggressive pinion drive side tooth top-land radius.

After the outside chamfer tool parameters have been determined for each ratio, a vision image of a common outside chamfer tool can be created.

As illustrated in FIG. 11c, a next step in the method may include selecting an initial design for the common inside or outside chamfer tool from the inside or outside chamfer tools of different ratios.

As illustrated in FIG. 11d, another aspect of the common outside chamfer tool design is matching the shoulder radius cutting edge of the ratio selected for the initial design of the common outside chamfer tool with the shoulder radius cutting edge of the outside chamfer tools of different ratios. This matching may be done simultaneously. This matching ensures that the design selected for the common outside chamfer tool will form an accurately dimensioned chamfer on the pinion drive side or ring gear coast side of the gear tooth regardless of the gear ratio being formed.

When selecting an initial design for a common outside chamfer tool, the method may further include the step of selecting the outside chamfer tool having the ratio with the smallest gear whole depth 76. The parameters of that ratio may then be used to create the common outside chamfer tool design. Selecting the ratio with the smallest pinion whole depth may allow the common outside chamfer tool to form the tooth top-land radius without cutting the tooth profile.

In order to design a common inside chamfer tool, the method of designing a common chamfer tool may further comprise the steps of obtaining an inside chamfer tool for each ratio in the gear family, selecting an initial design for the common inside chamfer tool from the inside chamfer tools, and matching a shoulder radius cutting edge of the initial design selected for the common inside chamfer tool and the shoulder radius cutting edge of each of the inside chamfer tools of different ratios.

To develop the inside chamfer tool design for each ratio, certain parameters need to be met. For a pinion gear, the cutting edge, clearance angle and edge radius of the inside chamfer tool of each ratio should match to the blade cutting edge 66, clearance angle NM and edge radius of the pinion inside cutter blade of the same ratio. The blade distance and the blade top width of the inside chamfer tool for each ratio should also be equal to the blade distance $PB_dI$ and the blade top width $PW_TI$ of the pinion inside cutter blade of the same ratio. For a ring gear, the cutting edge, clearance angle and edge radius of the inside chamfer tool of each ratio should match to the blade cutting edge 87, clearance angle $R\Phi_cI$ and edge radius of the ring gear inside cutter blade of the same ratio. The blade distance and the blade top width of the inside chamfer tool for each ratio should also be equal to the blade distance $RB_dI$ and the blade top width $RW_TI$ of the ring gear inside cutter blade of the same ratio. Aligning the parameters of the inside chamfer tools with the parameters of the inside cutter blades creates profiles for the inside chamfer tools that are substantially similar to the profiles of the inside cutter blades for each ratio in the family. This ensures that the inside chamfer tools are designed to form an accurately dimensioned chamfer in a proper location on the gear tooth.

Further, the axial grind depth of the ring gear and pinion inside chamfer tool of each ratio could be 60% of the gear whole depth 76. Therefore, the axial blade height of the inside chamfer tools will also affect the toe and heel tooth top-land radius depths for the gear tooth. Additionally, the shoulder radius cutting edge of ring gear and pinion the inside chamfer tool of each ratio could be approximately 30% to 40% and 75% to 100% of the gear whole depth 76. Increasing or decreasing the shoulder radius cutting edge of the inside chamfer tool will generate a less or more aggressive pinion coast side tooth top-land radius.

After the inside chamfer tool parameters have been determined for each ratio, a next step in the method may include selecting an initial design for a common inside chamfer tool from the inside chamfer tools of different ratios.

Another aspect of the common inside chamfer tool design may include matching the shoulder radius cutting edge of the ratio selected for the initial design with the inside chamfer tool shoulder radius cutting edges of different ratios. This matching may be done simultaneously. This matching ensures that the design selected for the common inside chamfer tool will form an accurately dimensioned chamfer on the ring gear drive side or pinion coast side of the gear tooth regardless of the gear ratio being formed.

When selecting an initial design for the common inside chamfer tool, the method may further include the step of selecting the inside chamfer tool having the ratio with the smallest gear whole depth 76. The parameters of that ratio may then be used to create the common inside chamfer tool design. Selecting the ratio with the smallest gear whole depth may allow the common inside chamfer tool to form the tooth top-land radius without cutting the tooth profile Another step that may be included in the design of both a common outside chamfer tool and a common inside chamfer tool includes using a close loop design philosophy to vary some of the parameters of the initial designs selected. That is, the parameters of the initial common outside chamfer tool design selected may be varied until the shoulder radius cutting edge of the initial common outside chamfer tool design matches the shoulder radius cutting edge of the outside chamfer tools of different ratios. Similarly, the parameters of the initial inside common inside chamfer tool design selected may be varied until the shoulder radius cutting edge of the initial common inside chamfer tool matches the shoulder radius cutting edge of the inside chamfer tools of different ratios. Such parameters include the blade angle, axial grind depth $PA_{XO}$, $PA_{XI}$, $RA_{XO}$, $RA_{XI}$ shoulder radius cutting edge P108, R108, P110, R110 and blade distance $PB_dO$, $PB_dI$ for a pinion gear or blade distance $RB_dO$, $RB_dI$ for a ring gear. These parameters can be varied until the shoulder radius cutting edge P108 or R108 of the common outside chamfer tool matches the shoulder radius cutting edges of the outside chamfer tools of different ratios. This also applies to the design of common inside chamfer tools. Matching the shoulder cutting radius of the common inside chamfer tools with the shoulder cutting radius of the inside chamfer tools ensures that the common inside chamfer tools will form accurately dimensioned chamfers in proper locations when forming any gear ratio within the same family. However, common chamfer tools may work for different families, as well.

An additional step of the method may also include adjusting the axial grind depth $PA_{XO}$, $PA_{XI}$, $RA_{XO}$, $RA_{XI}$ and shoulder radius P108, R108, P110, R110 of the common outside and inside chamfer tools until the pinion or ring gear tooth top-land radius is optimized.

Once formed, the common outside and inside chamfer tools may be used with pinion cutter blades or ring gear cutter blades. In one embodiment, the pinion outside and inside cutter blades 54, 52 and the common outside and inside chamfer blades P56, P58 may be secured to the cutting tool 36 in a conventional manner and at a selected radius and depth. In another embodiment, the ring gear outside and inside cutter blades 53, 55 and the common outside and inside chamfer blades R56, R58 may be secured to the cutting tool 36 in a conventional manner and at a selected radius and depth. Typically, the blades are secured to the cutter tool 36 in pairs.

In one embodiment, illustrated in FIG. 2, a first pair of blades may include a pinion outside cutter blade 54 and a pinion inside cutter blade 52. A second pair of blades may include a common outside chamfer tool P56 and a common inside chamfer tool P58. In another embodiment, a first pair of blades may include a ring gear outside cutter blade 53 and a ring gear inside cutter blade 55. A second pair of blades may include a common outside chamfer tool R56 and a common inside chamfer tool R58. Other variations of blade pairs may also be suitable.

However, the tip of common outside chamfer tool above the cutter head 36 $P_{ho}$, $R_{ho}$ is different from multiple ratios, as seen in FIG. 2. Similar, the tip of common inside chamfer tool above the cutter head 36 $P_{hi}$, $R_{hi}$ is different from multiple ratios, as seen in FIG. 2.

Figure 12:
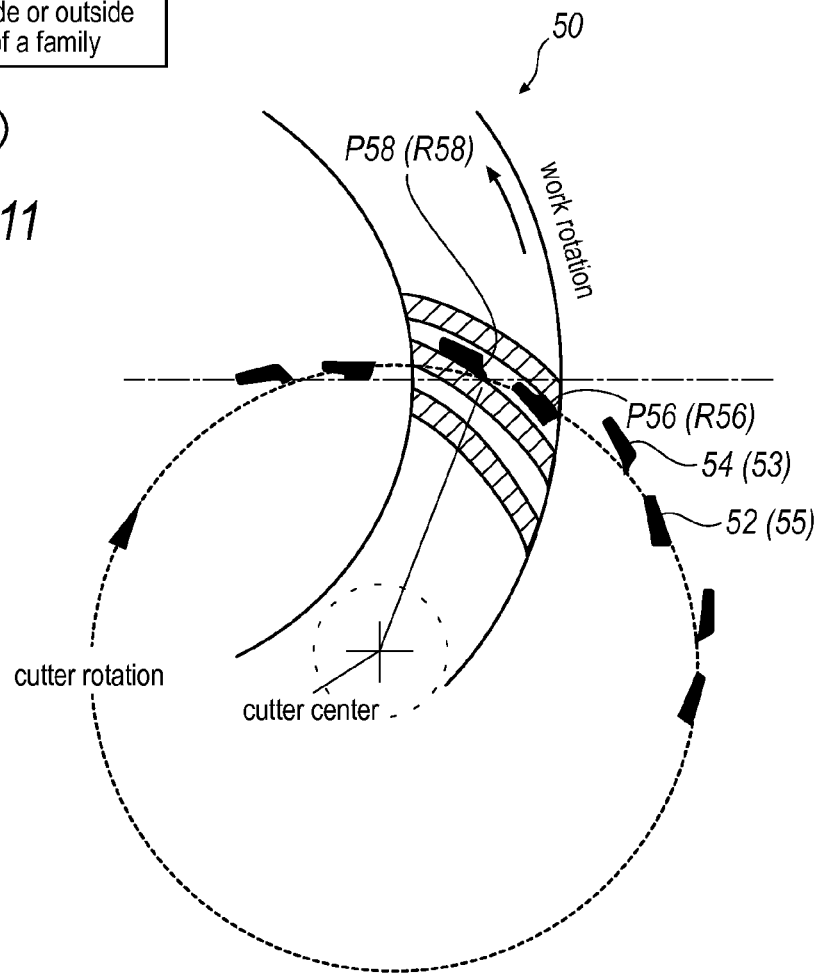
FIG. 12 is a schematic view of the orientation of a cutting tool to a gear stock.

When forming a hypoid pinion or ring gear with common outside and inside chamfer blades, the tool 36 is rotated relative to a gear stock. The outside and inside cutter blades 54, 52 or 53, 55 cut into the gear stock forming the gear tooth and the common outside and inside chamfer blades P56, R56, P58, R58 chamfer the gear tooth thereafter. In the exemplary embodiment illustrated, the gear stock 50 is rotated and the system 20 will vary the spatial orientation of the tool 36 relative to the gear stock. The relative movement of the tool 36 to the gear stock during each cutting, see FIG. 12, includes movements in the X and Y directions. Accordingly, the cuts made in the gear stock are not defined solely by the rotation of the tool 36 and the rotation of the gear stock 50, but also by the movements in the X and Y directions to form a desired tooth profile. The speed of rotation of the tool 36 and the stock 50 may be several hundred or several thousand rotations per minute (rpm).

In one embodiment, the tooth 70 and tooth top-land radius P78 may be formed from a toe 112 to a heel 114 of the pinion gear tooth. In another embodiment, tooth 71 and tooth top-land radius R78 may be formed from a toe 113 to a heel 115 of the ring gear tooth.

Using cutter system 20 and cutting tool 36 with pairs of outside and inside pinion cutter blades 52, 54 and pairs of common outside and inside pinion chamfer tools P56, P58 configured according to FIG. 2 or any other suitable embodiment, the gear tooth and tooth top-land radius are generated separately. The same is true if outside and inside ring gear cutter blades and common outside and inside ring gear chamfer tools were used. During the pinion or ring gear cutting process, the regular outside and inside cutter blades 54, 52 or 53, 55 will generate the gear tooth while the common outside and inside chamfer tools P56, P58, R56, R58 will generate the tooth top-land radius P78 or R78. Thus, the ring gear or pinion common outside and inside chamfer tools allow the creation of the ring gear or pinion tooth top-land radius of multiple ratios using the same common outside and inside chamfer tools. Accordingly, this method of cutting and common chamfering reduces the number of chamfer tool builds, improves the consistency of tooth top-land radius formation by reducing chamfer tool variations, and reduces cutter grinder change over time. Previously, the chamfer tool design was more specific to pinion geometry or ring gear geometry for each ratio and a unique chamfer tool was needed to generate the tooth top-land chamfer of each ratio. Further this method of cutting and common chamfering could employ the use of common cutter blades and common chamfer tools further reducing cutter grinder change over time.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An apparatus for chamfering a gear tooth top-land radius of multiple gear ratios comprising:
   a gear cutter tool having multiple blade attachments;
   at least one pair of ring gear or pinion cutting blades, one of the ring gear or pinion blades being an outside cutting blade and one of the ring gear or pinion blades being an inside cutting blade; wherein
   the outside cutter blade forms a drive side surface of a pinion gear or a coast side surface of a ring gear; and
   the inside cutter blade forms a coast side surface of a pinion gear or a drive side surface of a ring gear;

at least one pair of chamfer blades, one of the chamfer blades being an outside chamfer blade and one of the chamfer blades being an inside chamfer blade wherein the outside chamfer blade forms a ring gear coast side or pinion drive side tooth top-land radius of multiple gear ratios; and the inside chamfer blade forms a ring gear drive side or pinion coast side tooth top-land radius of multiple gear ratios.

2. The apparatus of claim 1, including multiple pairs of ring gear or pinion cutting blades.

3. The apparatus of claim 2, further comprising a device for rotating the gear cutter tool and rotating a stock, wherein the device is programmable to selectively vary the spatial orientation of the gear cutter tool relative to the stock.

4. The apparatus of claim 1, wherein the tooth top-land radius is formed from a toe to a heel of the gear tooth.

* * * * *